(12) United States Patent
Frank

(10) Patent No.: US 8,304,740 B1
(45) Date of Patent: Nov. 6, 2012

(54) MOBILE FRAME STRUCTURE WITH PASSIVE/ACTIVE SENSOR ARRAYS FOR NON-INVASIVE IDENTIFICATION OF HAZARDOUS MATERIALS

(75) Inventor: David L. Frank, Boca Raton, FL (US)

(73) Assignee: Innovative American Technology, Inc., Coconut Creek, FL (US)

( * ) Notice: Subject to any disclaimer, the term of this patent is extended or adjusted under 35 U.S.C. 154(b) by 783 days.

(21) Appl. No.: 12/468,382

(22) Filed: May 19, 2009

Related U.S. Application Data

(60) Provisional application No. 61/128,115, filed on May 19, 2008, provisional application No. 61/208,492, filed on Feb. 25, 2009, provisional application No. 61/210,075, filed on Mar. 13, 2009, provisional application No. 61/209,194, filed on Mar. 4, 2009, provisional application No. 61/210,234, filed on Mar. 16, 2009, provisional application No. 61/210,122, filed on Mar. 13, 2009.

(51) Int. Cl.
*G01T 1/20* (2006.01)
(52) U.S. Cl. .................................. 250/370.11
(58) Field of Classification Search .............. 250/370.11
See application file for complete search history.

(56) References Cited

U.S. PATENT DOCUMENTS

| | | | |
|---|---|---|---|
| 3,858,728 A | 1/1975 | Fathauer |
| 3,872,287 A | 3/1975 | Koeman |
| 4,158,773 A | 6/1979 | Novak |
| 4,535,246 A | 8/1985 | Shani |
| 4,799,828 A | 1/1989 | Georgii |
| 5,056,958 A | 10/1991 | Campbell |
| 5,081,581 A | 1/1992 | Koral et al. |
| 5,241,573 A | 8/1993 | Thacker |
| 5,298,756 A | 3/1994 | McCollum et al. |
| 5,308,986 A | 5/1994 | Walker |
| 5,434,415 A | 7/1995 | Terada et al. |
| 5,633,508 A | 5/1997 | Schleppenbach |

(Continued)

FOREIGN PATENT DOCUMENTS

JP 55050178 A 4/1980

(Continued)

OTHER PUBLICATIONS

Speller, Robert, Radiation based Security, 2001, Radiation Physics and Chemistry, vol. 61, pp. 293-300.*

(Continued)

*Primary Examiner* — Christine Sung
(74) *Attorney, Agent, or Firm* — Fleit Gibbons Gutman Bongini & Bianco PL; Jose Gutman

(57) ABSTRACT

A system, method, and mobile frame structure detect radiation and identify materials associated with radiation that has been detected. A mobile frame structure is maneuvered over an entity to be examined. A set of radiation data associated with the entity is received from a set of radiation sensors that are mechanically coupled to the at least one portion of the mobile frame structure. At least one histogram is generated based on the set of radiation data. The at least one histogram is compared to multiple spectral images associated with known materials. The at least one histogram is determined to substantially match at least one of the multiple spectral images. A determination is made whether a material associated with the at least one of the multiple spectral images is a hazardous material. Personnel is notified that the at least one radiation source is a hazardous material.

15 Claims, 10 Drawing Sheets

U.S. PATENT DOCUMENTS

| | | | |
|---|---|---|---|
| 5,638,420 A * | 6/1997 | Armistead | 378/57 |
| 5,665,970 A | 9/1997 | Kronenberg et al. | |
| 5,703,490 A | 12/1997 | Kennedy | |
| 5,739,592 A | 4/1998 | Rigsby et al. | |
| 5,838,759 A | 11/1998 | Armistead | |
| 5,866,907 A | 2/1999 | Drukier et al. | |
| 6,011,266 A | 1/2000 | Bell | |
| 6,370,222 B1 | 4/2002 | Cornick | |
| 6,407,390 B1 | 6/2002 | Rozsa | |
| 6,433,335 B1 | 8/2002 | Kronenberg et al. | |
| 6,479,826 B1 | 11/2002 | Klann et al. | |
| 6,515,285 B1 | 2/2003 | Marshall et al. | |
| 6,545,281 B1 | 4/2003 | McGregor et al. | |
| 6,791,089 B1 | 9/2004 | Caffrey et al. | |
| 6,845,873 B1 | 1/2005 | Chattey | |
| 6,891,470 B2 | 5/2005 | Bohinc | |
| 6,937,692 B2 | 8/2005 | Johnson | |
| 6,980,483 B2 | 12/2005 | McDonald | |
| 6,998,617 B2 | 2/2006 | D'Emilio et al. | |
| 7,005,982 B1 | 2/2006 | Frank | |
| 7,026,944 B2 | 4/2006 | Alioto et al. | |
| 7,030,755 B2 | 4/2006 | Bohinc | |
| 7,040,435 B1 | 5/2006 | Lesesky et al. | |
| 7,064,336 B2 | 6/2006 | Archer et al. | |
| 7,115,875 B1 | 10/2006 | Worstell | |
| 7,116,235 B2 | 10/2006 | Alioto et al. | |
| 7,142,109 B1 | 11/2006 | Frank | |
| 7,151,447 B1 | 12/2006 | Willms et al. | |
| 7,164,138 B2 | 1/2007 | McGregor et al. | |
| 7,183,554 B2 | 2/2007 | Gallagher et al. | |
| 7,269,527 B1 | 9/2007 | Frank | |
| 7,319,717 B2 | 1/2008 | Zitting | |
| 7,324,921 B2 | 1/2008 | Sugahara | |
| 7,356,115 B2 | 4/2008 | Ford et al. | |
| 7,383,142 B2 * | 6/2008 | Scoullar et al. | 702/66 |
| 7,391,028 B1 | 6/2008 | Rubenstein | |
| 7,411,198 B1 | 8/2008 | Holland et al. | |
| 7,414,526 B2 | 8/2008 | Zitting et al. | |
| 7,423,273 B2 * | 9/2008 | Clayton et al. | 250/358.1 |
| 7,465,924 B1 | 12/2008 | Klann et al. | |
| 7,550,738 B1 | 6/2009 | DeVito | |
| 7,592,601 B2 | 9/2009 | Frank | |
| 7,609,158 B2 | 10/2009 | Banting et al. | |
| 7,677,857 B2 * | 3/2010 | Takehara et al. | 414/140.3 |
| 7,759,649 B2 | 7/2010 | Frank | |
| 7,851,766 B2 | 12/2010 | Frank | |
| 7,893,557 B2 | 2/2011 | Davis et al. | |
| 2002/0175291 A1 | 11/2002 | Reeder et al. | |
| 2003/0108150 A1 | 6/2003 | Franke | |
| 2003/0144800 A1 | 7/2003 | Davis et al. | |
| 2003/0165211 A1 | 9/2003 | Grodzins et al. | |
| 2003/0201394 A1 | 10/2003 | Peoples | |
| 2004/0018060 A1 | 1/2004 | Knezek et al. | |
| 2004/0119591 A1 | 6/2004 | Peeters | |
| 2004/0126895 A1 | 7/2004 | Overbeck et al. | |
| 2004/0148137 A1 | 7/2004 | Zerwekh et al. | |
| 2004/0207262 A1 | 10/2004 | Yanagida et al. | |
| 2005/0001728 A1 | 1/2005 | Appelt et al. | |
| 2005/0011849 A1 | 1/2005 | Chattey | |
| 2005/0023477 A1 | 2/2005 | Archer et al. | |
| 2005/0082485 A1 | 4/2005 | Torii | |
| 2005/0135535 A1 | 6/2005 | Wallace | |
| 2005/0156734 A1 | 7/2005 | Zerwekh et al. | |
| 2005/0205793 A1 | 9/2005 | Bohinc | |
| 2005/0220247 A1 | 10/2005 | Ruddy et al. | |
| 2005/0224719 A1 | 10/2005 | Polichar et al. | |
| 2005/0258372 A1 | 11/2005 | McGregor et al. | |
| 2005/0275545 A1 | 12/2005 | Alioto et al. | |
| 2006/0097171 A1 | 5/2006 | Balchunas et al. | |
| 2006/0138331 A1 | 6/2006 | Guillebaud et al. | |
| 2006/0141615 A1 | 6/2006 | Lu | |
| 2006/0157655 A1 | 7/2006 | Mammone et al. | |
| 2006/0284094 A1 | 12/2006 | Inbar | |
| 2007/0001123 A1 | 1/2007 | Andrews et al. | |
| 2007/0290136 A1 | 12/2007 | Ivan | |
| 2008/0023631 A1 | 1/2008 | Majors et al. | |
| 2008/0135772 A1 * | 6/2008 | Claus et al. | 250/390.01 |
| 2008/0159416 A1 | 7/2008 | Melick et al. | |
| 2009/0014662 A1 | 1/2009 | Suhami | |
| 2009/0102680 A1 | 4/2009 | Roos | |
| 2010/0226580 A1 | 9/2010 | Frank | |

FOREIGN PATENT DOCUMENTS

| | | |
|---|---|---|
| JP | 58223775 A | 12/1983 |
| JP | 1144768 A | 2/1999 |
| JP | 2008111677 A | 5/2008 |
| KR | 10-1992-7004134 | 12/1992 |
| KR | 200191370 Y1 | 8/2000 |
| KR | 10-1005-0067392 | 7/2005 |
| WO | WO98-00681 | 1/1998 |
| WO | 2004043740 A2 | 5/2004 |
| WO | WO 2006050226 | 5/2006 |
| WO | WO2006-085999 | 8/2006 |
| WO | 2007065004 A2 | 6/2007 |
| WO | 2008118219 A2 | 10/2008 |

OTHER PUBLICATIONS

International Search Report and Written Opinion dated Dec. 23, 2009 for PCT/US2009/044486.
U.S. Appl. No. 11/291,574, filed Dec. 2005, Frank.
U.S. Appl. No. 11/363,594, filed Feb. 2006, Frank.
U.S. Appl. No. 11/564,193, filed Nov. 2006, Frank.
U.S. Appl. No. 11/931,370, filed Oct. 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.
Non-Final Rejection for U.S. Appl. No. 11/931,211 dated Apr. 30, 2010.
Mc Gregor, Douglas S., et al, Bulk GaAs-Based Neutron Detectors for Spent Fuel Analysis, Proceedings of ICONE 8, ICONE—8827, 8th Int'l Conf. on Nuclear Engineering, Apr. 2-6, 2000, pp. 1-8, Baltimore, MD.

Klann, Raymond T., et al. Development of Coated Gallium Arsenide Neutron Detectors, Proceedings of ICONE 8, ICONE—8110, 8th Int'l Conf. on Nuclear Engineering, Apr. 2-6, 2000, pp. 1-6, Baltimore, MD.

Mc Gregor, Douglas S., et al., Designs for Thin-Film-Coated Semiconductor Thermal Neutron Detectors, Nov. 14, 2001, pp. 1-5.

Mc Gregor, Douglas S., et al., New Surface Morphology for Low Stress Thin-Film-Coated Thermal Neutron Detectors, IEEE Transactions on Nuclear Science, vol. 49, No. 4, Aug. 2002, pp. 1999-2004.

Mc Gregor, Douglas S., et al., Design considerations for thin film coated semiconductor thermal neutron detectors—I: basics regarding alpha particle emitting neutron reactive films; Nuclear Instruments and Methods in Physics Research A 500 (2003) pp. 272-308.

Shultis, J. Kenneth, et al., Efficiencies of Coated and Perforated Semiconductor Neutron Detectors, IEEE Transactions on Nuclear Science, vol. 53, No. 3, pp. 1659-1665, Jun. 2006.

Mc Neil, W.J., et al., Perforated Diode Fabrication for Neutron Detection, 2006 IEEE Nuclear Science Symposium Conference Record, pp. 3732-3735, Nov. 17, 2006.

Mc Gregor, D.S., et al., Perforated Semiconductor Neutron Detector Modules, 32nd Annual GOMAC Tech Conference, Mar. 19-22, 2007.

Mc Gregor, Douglas S., et al., Perforated Semiconductor Neutron Detector Modules for Detection of Spontaneous Fission Neutrons, IEEE Conference on Technologies for Homeland Security, May 16-17, 2007.

Shultis, Kenneth J. et al., Designs for Micro-Structured Semiconductor Neutron Detectors, Invited Paper, Proc. SPIE 7079, 70790-6 (2008) pp. 6-1: 6-15.

Mc Gregor, D.S., et al., Micro-Structured High-Efficiency Semiconductor Neutron Detectors, 2008 IEEE Nuclear Science Symposium Conference Record, pp. 446-448, Nov. 12, 2008.

Ugorowski, P., et al., Characterization of the High-Efficiency Neutron Detector Array (HENDA), 2008 IEEE Nuclear Science Symposium Conference Record, pp. 1901-1903.

Unruh, Troy C., et al., Design and operation of a 2-D thin-film semiconductor neutron detector array for use as a beamport monitor, Nuclear Instruments and Methods in Physics Research A 604 (2009) 150-153.

Mc Neil, Walter J., et al., 1-D array of perforated diode neutron detectors, Nuclear Instruments and Methods in Physics Research A 604 (2009) 127-129.

Bellinger, S.L., et al., Characteristics of 3D Micro-Structured Semiconductor High Efficiency Neutron Detectors, IEEE Transactions on Nuclear Science, vol. 56, No. 3, Jun. 2009, pp. 742-746.

Harrison, Mark J., et al., Improved Techniques for the Fabrication of Frisch Collar CdZnTe Gamma Ray Spectrometers, IEEE Transactions on Nuclear Science, vol. 56, No. 3, Jun. 2009, pp. 1671-1676.

Mc Gregor, D.S., et al., Microstructured semiconductor neutron detectors, Nuclear Instruments and Methods in Physics Research A 608 (2009) 125-131.

International Search Report and Written Opinion, PCT/US2009/047084, Jun. 11, 2009.

International Search Report and Written Opinion of the International Searching Authority for PCT/US2010/025429 dated Sep. 28, 2010.

International Search Report and Written Opinion of the International Searching Authority for PCT/US2010/025432 mailed Sep. 28, 2010.

International Preliminary Report & Written Opinion for PCT/US2010/025429, dated Aug. 30, 2011.

International Search Report and Written Opinion of the International Searching Authority for PCT/US2010/025435 mailed Nov. 30, 2010.

Arni Heller: Smart Buoys Help Protect Submarine Base; Jan. Feb. 2004; Lawrence Livermore National Laboratory; pp. 19-22.

Non-Final Office Action for U.S. Appl. No. 12/840,102, mailed Aug. 17, 2011.

Non-Final Office Action for U.S. Appl. No. 12/409,733, mailed Sep. 2, 2011.

Notice of Allowance for U.S. Appl. No. 12/472,707, mailed Sep. 30, 2011.

Corinex Communications Corp., http://corinex.com/web/wcx2.nsf/o/eng-enter.

Haaland, D.M., et al., "Application of New Least-Square Methods for the Quantitative Infrared Analysis of Multicomponent Samples", Applied Spectroscopy, Nov. 1, 1982, vol. 36, No. 6, 665-673, Baltimore, U.S.

Bouchet, L., "A Comparative Study of Deconvolution Methods for Gamma-Ray Spectra", Astronomy and Astrophysics Supplement, Oct. 1995, vol. 113, 167-183.

Luo, L., "Chemometrics and its Applications to X-Ray Spectrometry", X-Ray Spectrometry, Jul. 1, 2006, vol. 35, No. 4, 215-225.

Jastaniah et al., "Digital pulse shape algorithms for scintillation-based neutron detectors", 2001 IEEE Nuclear Science Symposium Conference Record, vol. 2 (Nov. 2001) pp. 816-821.

Office Action dated Mar. 9, 2012 for U.S. Appl. No. 12/483,066.

Office Action dated Jun. 8, 2012 for U.S. Appl. No. 11/928,299.

Office Action dated Jul. 5, 2012 for U.S. Appl. No. 12/698,598.

Office Action dated Jun. 21, 2012 for U.S. Appl. No. 12/501,220.

Office Action dated Mar. 9, 2012 for U.S. Appl. No. 12/409,758.

International Search Report dated Sep. 29, 2008 for International Application No. PCT/US2008/062319.

Search Opinion dated May 4, 2012 for European Application No. 08705975.4.

* cited by examiner

MOBILE FRAME STRUCTURE WITH PASSIVE/ACTIVE SENSOR ARRAYS FOR NON-INVASIVE IDENTIFICATION OF HAZARDOUS MATERIALS

CROSS-REFERENCE TO RELATED APPLICATIONS

This application is based on and claims priority to provisional U.S. Patent Application No. 61/128,115, entitled "Mobile Frame Structure With Passive/Active Sensor Arrays For Non-Invasive Analysis For CBRNE Materials Present", filed on May 19, 2008, and to U.S. patent application Ser. No. 12/409,758, entitled "Horizontal Sensor Arrays For Non-Invasive Identification Of Hazardous Materials", filed on Mar. 24, 2009, by the same inventor, which is based on and claims priority to previously, provisional U.S. Patent Application No. 61/070,560, entitled "Horizontal Sensor Arrays For Non-Invasive Analysis Of CBRNE Materials Present", filed on Mar. 24, 2008, by the same inventor, and this application is also based on provisional U.S. Patent Application No. 61/208,492, entitled "Method For Increased Gamma/Neutron Detector Performance", filed on Feb. 25, 2009, by the same inventor, and to provisional U.S. Patent Application No. 61/210,075, entitled "Method For Increased Gamma/Neutron Detector Performance", filed on Mar. 13, 2009, by the same inventor, and to provisional U.S. Patent Application No. 61/209,194, entitled "High Performance Neutron Detector With Near Zero Gamma Cross Talk", filed on Mar. 4, 2009, by the same inventor, and to provisional U.S. Patent Application No. 61/210,122, entitled "High Performance Neutron Detector With Near Zero Gamma Cross Talk, version 2", filed on Mar. 13, 2009, by the same inventor; and provisional U.S. Patent Application No. 61/210,234, entitled "High Performance Neutron Detector With Near Zero Gamma Cross Talk, version-3", filed on Mar. 16, 2009, by the same inventor; the entire collective teachings of which being incorporated herein by reference.

FIELD OF THE INVENTION

The present invention generally relates to the field of hazardous materials detection, and more particularly relates to a mobile frame structure including various active/passive sensor arrays for identifying hazardous materials at an item being examined.

BACKGROUND OF THE INVENTION

Hazardous material detection is an integral part of safeguarding our well being from the threats of domestic and foreign terror. Some hazardous material detection systems are deployed on mobile platforms. However, most current mobile radiation detection and CBRNE (chemical, biological, radioactive, nuclear, and explosive) sensor systems generally cannot provide effective throughput rates for inspection and cannot provide detection and identification of shielded nuclear materials.

Gamma imaging systems are time consuming devices that only indicate the presence of potential shielding for nuclear materials. Use of a gamma imaging system to generate energy for detecting nuclear materials requires large amounts of energy. Therefore, substantial shielding is needed so that humans can safely operate these devices. X-ray based devices also have the same issues associated with the gamma imaging systems. The size and weight factors for the gamma and x-ray systems also create a challenge for mobility.

One particular implementation of mobile detection systems is on shuttle carriers for use at seaports. However, these devices are extremely large and are designed to inspect containers stacked as many as four high. This straddle carrier design cannot be transported outside of the port by standard transport equipment such as a flat bed truck since the structure is too large.

Therefore a need exists to overcome these problems discussed above.

SUMMARY OF THE INVENTION

In one embodiment, a method for detecting radiation and identifying materials associated with radiation that has been detected is disclosed. The method includes maneuvering a mobile frame structure over an entity to be examined for radiation sources. A set of radiation data associated with the entity is received from a set of radiation sensors that are mechanically coupled to the at least one portion of the mobile frame structure. At least one histogram is generated based on the set of radiation data. The at least one histogram represents a spectral image of the entity. The at least one histogram is compared to a plurality of spectral images associated with known materials. The at least one histogram is determined to substantially match at least one of the plurality of spectral images. A determination is made whether material associated with the at least one of the plurality of spectral images is a hazardous material. Personnel are notified that the at least one radiation source is a hazardous material in response to determining that the material associated with the at least one of the plurality of spectral images comprises hazardous material.

In another embodiment, a mobile frame structure for detecting radiation and identifying materials associated with radiation that has been detected is disclosed. The mobile frame structure includes a mobility mechanism for maneuvering the mobile frame structure over an entity. The mobile frame structure also includes a first side portion and at least a second side portion situated opposite to the first side portion. A passage is created between the first side portion and the at least second side portion that is configured to allow the entity to pass between the first side portion and the at least second additional side portion. At least one of the first side portion and the second side portion are adjustable in position. At least one set of radiation sensors is mechanically coupled to at least one of the first side portion and the at least second side portion. A communication mechanism is communicatively coupled to the at least one set of radiation sensors, wherein the communication mechanism transmits a set of radiation data associated with the entity that has been detected by the set of radiation detectors to at least one information processing system.

In yet another embodiment a system for detecting radiation and identifying materials associated with radiation that has been detected id disclosed. The system includes a mobile frame structure and at least one information processing system that is communicatively coupled to the mobile frame structure. The mobile frame structure includes a mobility mechanism for maneuvering the mobile frame structure over an entity. The mobile frame structure also includes a first side portion and at least a second side portion situated opposite to the first side portion. A passage is created between the first side portion and the at least second side portion that is configured to allow the entity to pass between the first side portion and the at least second side portion. At least one of the first side portion and the second side portion are adjustable in position. At least one set of radiation sensors is mechanically coupled to at least one of the first side portion and the at least second side portion. A communication mechanism is communicatively coupled to the at least one set of radiation sensors, wherein the communication mechanism transmits a set of radiation data associated with the entity that has been detected by the set of radiation sensors to at least one information processing system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
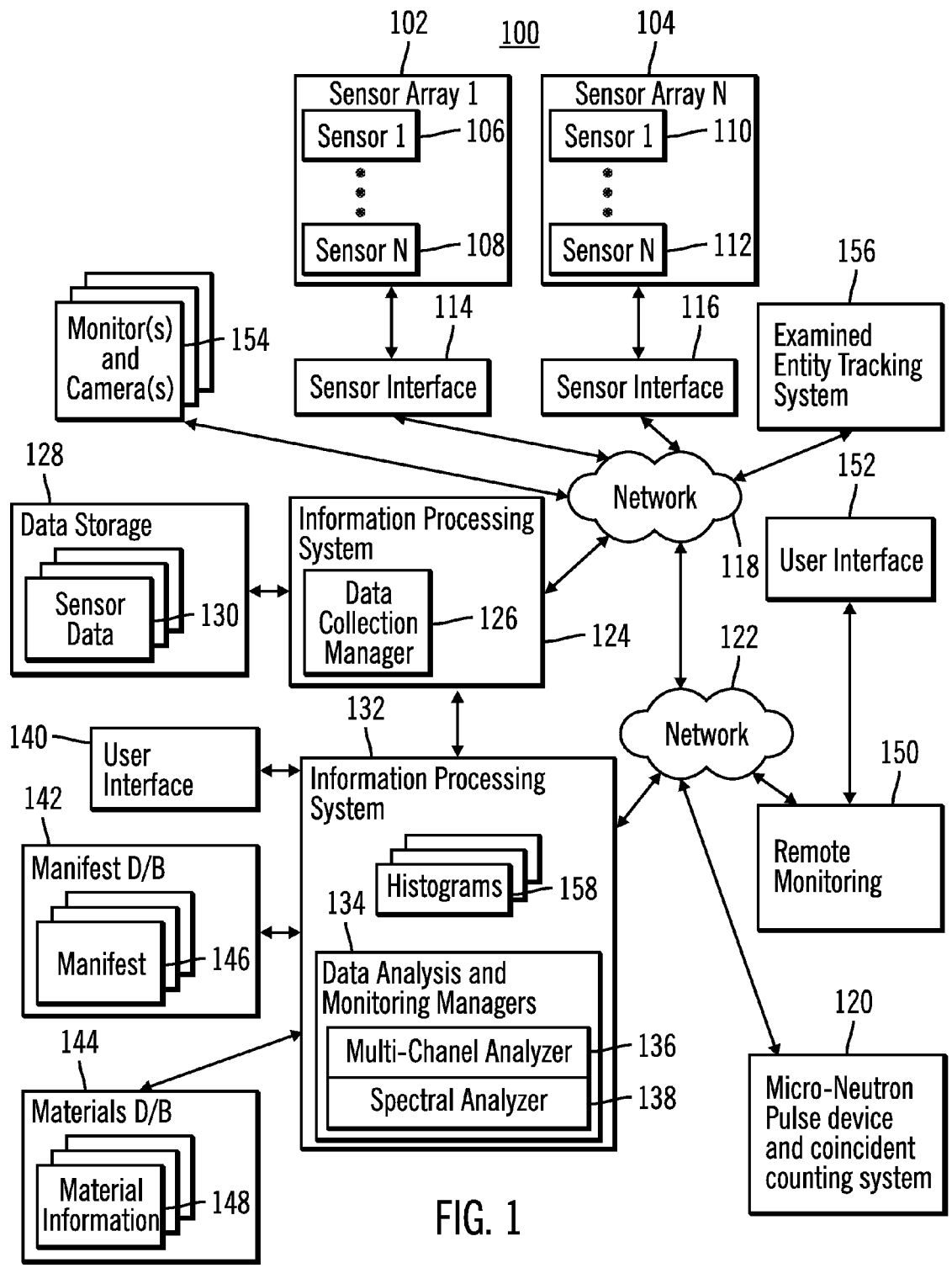
FIG. 1 is a block diagram illustrating a general overview of an operating environment according to one embodiment of the present invention.

According to one embodiment of the present invention as shown in FIG. 1 a general view of an operating environment 100 is illustrated. In one embodiment all or part of the operating environment 100 is implemented on a mobile frame structure 200 (see also FIG. 2) for enabling the detection, analysis, and identification of hazardous materials such as CBRNE materials. For example, a mobile frame structure 200 can be equipped with passive an/or active sensor systems for the non-invasive analysis of vehicles, trains, planes, boats, containers, packages, containers, and the like to detect and identify radiological, fissile, explosive, chemical, and biological materials.

In particular, FIG. 1 shows a one or more sensor arrays 102, 104 each including a plurality of sensors 106, 108, 110, 112. In one embodiment, the sensors of one sensor array are gamma radiation sensor devices and the sensors in the other sensor array are neutron sensor devices. However, each of the sensor arrays 102, 104 can include a combination of gamma and neutron sensing devices as well. Examples of radiation detectors are cadmium zinc telluride detectors, sodium iodide detectors, and the like. Neutron detectors can be solid-state neutron detectors, which provide shock resistance. Also, to assist in the detection of radiation at distances, the gamma detectors may be equipped with collimators and/or lenses that gather the radiological particles and focus these particles onto the detectors. Shock resistance detectors are suitable for verifying radiation from objects that can move and cause shock/vibration hazards to the sensors. Each sensor array 102, 104 is communicatively coupled to a sensor interface 114, 116 either by a wired and/or wireless communication link. The sensor interfaces 114, 116 communicatively coupled the sensor arrays 102, 104 to a first network 118 thereby creating a distributed sensor network.

The first network includes wired and/or wireless technologies and the sensor interface units 114 are communicatively coupled to the first network 118 either wirelessly and/or via wired mechanisms. In one embodiment, the sensor interfaces 114, 116 assign a unique IP address to each of the sensors 106, 108, 110, 112 within the sensor arrays 102, 104. The sensor interfaces 114, 116, in one embodiment, are sensor integration units ("SIU") that provide the calibration, automated gain control, calibration verification, remote diagnostics, and connectivity to the processor for spectral analysis of the sensor data. SIUs are discussed in greater detail in in U.S. Pat. No. 7,269,527 entitled "System integration module for CBRNE sensors", filed on Jan. 17, 2007, which is herein incorporated by reference in its entirety. It should be noted that although FIG. 1 shows each of the sensor arrays 102, 104 coupled to a separate sensor interface 114, 116 a single sensor interface can be coupled to all of the sensor arrays 102, 104.

One or more micro-neutron pulse devices 120 are also included within the operating environment 100 and are communicatively coupled to a second network 122. A micro-neutron pulse device 120 is an active analysis device that emits neutron pulses and whereby gamma feedback identifies shielded radiological materials such as highly enriched uranium, explosives, illicit drugs, or other materials. The first and second networks 118, 122 can include any number of local area networks and/or wide area networks. It should be noted that even though FIG. 1 shows two networks 118, 122, a single network can be implemented or additional networks can be added.

The operating environment 100 also includes an information processing system 124 communicatively coupled to the first network 110 via one or more wired and/or wireless communication links. The information processing system 124 includes a data collection manager 126 and is communicatively coupled to one or more data storage units 128. The one or more storage units 128 can reside within the information processing system 122 and/or outside of the system 122 as shown in FIG. 1. The data collection manager 126 manages the collection and/or retrieval of data 130 generated by the sensors 106, 108, 110, 112 within the sensor arrays 102, 104 and optionally the micro-neutron pulse detector 120.

The data 130 generated by each of the sensors 106, 108, 110, 112, in one embodiment, is detailed spectral data from each sensor device that has detected radiation such as gamma radiation and/or neutron radiation. The data collection manager 126, in one embodiment, stores the data 130 received/retrieved from the sensor arrays 102, 104 and/or the neutron pulse detector 120 in one or more data storage devices 128. A data storage device 128 can be a single hard-drive, two or more coupled hard-drives, solid state memory devices, and/or optical media such as (but not limited to) compact discs and digital video discs, and the like. It should be noted that this list of storage devices is not exhaustive and any type of storage device can be used. It should also be noted that information processing system 124 including the data collection manager 126 is modular in design and can be used specifically for radiation detection and identification and/or for data collection for explosives and special materials detection and identification.

The operating environment 100, in one embodiment, also includes an information processing system 132 communicatively coupled to the at least a second network 122 via one or more wireless and/or wired communication technologies. The information processing system 132, in one embodiment, includes a data analysis and monitoring manager 134 that analyzes and monitors the data 130 retrieved/received from the sensor arrays 102, 104 and optionally the micro-neutron pulse detector 120. The data analysis and monitoring manager 134, in one embodiment, includes a multi-channel analyzer 136 and a spectral analyzer 138. The data analysis and monitoring manager 134 and each of these components 136, 138 are discussed in greater detail below.

In one embodiment, a user interface 140, a manifest database 142, and a materials database 144 are communicatively coupled to the information processing system 132 either directly or via a network (e.g. the second network 122). The user interface 140, in one embodiment, is one or more displays, input devices, output devices and/or the like that allows a user to monitor and/or interact with the information processing system 132. The data and analysis functionality of the information processing system 132, which is discussed in greater detail below, can either be automated and/or supplemented with human interaction. The user interface(s) 140 enables this human interaction.

The manifest database 142 includes a plurality of manifests 146 associated with shipping cargo, which can be cargo on a water vessel, a ground vessel (e.g., cars, trucks, and/or trains), and/or an air transportation vessel. A manifest 146 includes a detailed description of the contents of each container or cargo that is to be examined by the sensor arrays 102, 104 and/or the neutron pulse device(s) 120. The manifests 146 are used by the information processing system 132 to determine whether the possible materials, goods, and/or products within the container package, car, truck, or the like match the expected authorized materials, goods, and/or products, described in the manifest 146 for the particular entity under examination. The use of a manifest 146 during examination of an entity is discussed in greater detail below.

The materials database 144 includes materials information 148 such as chemical material information, biological material information, radioactive material information, nuclear material information, and/or explosive material information. Also, the materials information 148 can include isotope information for known isotopes. For example, isotope information can include spectral images, histograms, energy levels, and/or the like associated with known isotopes. The materials information 148, in one embodiment, is used by the data analysis and monitoring manager 134 to determine whether any hazardous materials are within an entity that is being examined. This identification/detection process is discussed in greater detail below.

It should be noted that although the manifest database 142 and the materials database 144 are shown in FIG. 1 as being separate from the information processing system 132, one or more of these databases 142, 144 can reside within the information processing system 132 as well. Furthermore, the components of the information processing system 124 and the information processing system 132 can be implemented within a single information processing system as compared to multiple systems as shown in FIG. 1.

The operating environment 100, in one embodiment, also includes a remote monitoring information processing system 150 communicatively coupled to the second network 122. A user interface 152, which can include one or more displays, input devices, output devices and/or the like that allows a user to monitor and/or interact with the remote system 150, is communicatively to the system 150. The remote monitoring system 150 includes a computer, memory, and storage and enables a user to remotely monitor, manage, and/or control the mobile frame structure 200 and/or the data analysis and monitoring processes being performed at the information processing system 132. Also, the remote monitoring system 150 can be a device such as a wireless communication device, portable computer, desktop and/or the like that receives notifications from the information processing system 132 regarding the data analysis and monitoring process.

In one embodiment, one or more monitors/camera systems 154 such as (but not limited to) a closed circuit television system are also included within the operating environment 100. The cameras within this system 154 can be deployed around a mobile frame structure 200 at various locations so that an operator can monitor the location of the frame structure 200 and the sensors on the structure 200 with respect to an entity being examined. Also, an examined entity tracking system 156 is also included within the operating environment 100. The examiner entity tracking system 156 tracks and monitors the identity of each entity such as a truck, car, train, boat, plain, cargo container, package, and the like being examined. The tracking system 156 can include digital cameras, radio frequency identification tag ("RFID") readers, bar code scanners, character recognition mechanisms, marking systems, and the like that allow the tracking system to identify an entity currently being examined. This allows the information processing system 132 and/or an operator to determine if an entity has previously been examined and to also flag an entity when hazardous materials potentially reside within the entity.

Mobile Frame Structure for Non-Invasive Detection of Hazardous Materials

Figure 2:
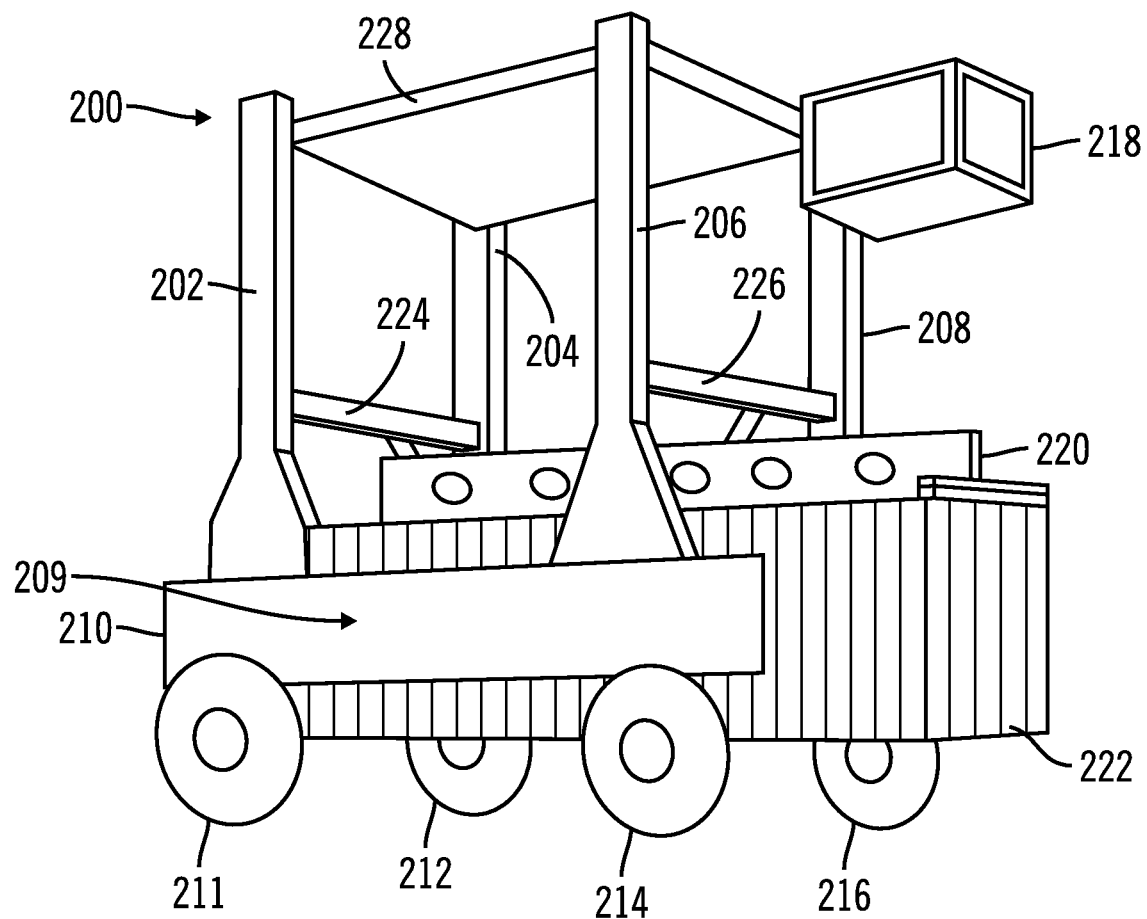
FIG. 2 is a block diagram illustrating one example of a mobile frame structure according to one embodiment of the present invention.

The following is a more detailed discussion on implementing the operating environment 100 (or at least a portion of the environment) discussed above with respect to FIG. 1 on a mobile frame structure 200. FIG. 2 shows one example of a mobile frame structure 200 according to one embodiment of the present invention. The mobile frame structure 200, in one embodiment, provides a transportable and mobile sensor system for analyzing an entity such as (but not limited to) a container, vehicle, train, package or cargo in a non-invasive approach. In one embodiment, the frame structure 200 can be configured similar to a short version of a shuttle carrier for container movement at a sea port.

The mobile frame structure 200, in one embodiment, includes four vertical structures 202, 204, 206, 208 situated at the corners of the mobile frame structure 200. A horizontal member 210 is mechanically coupled to the first and second vertical structures 202, 206 which are deployed on a first side 209 of the mobile frame structure 200. A second horizontal structure (not shown), which is substantially similar to the first horizontal structure, is mechanically coupled to the third and fourth vertical structures 204, 208 which are deployed on a second side (not shown) directly opposite the first side of the mobile frame structure 200. The horizontal members 210, in one embodiment, mechanically couple a set of moving members such as wheels 210, 212, 214, 216 to the mobile frame structure 200. The moving members 211, 212, 214, 216 enable the mobile frame structure 200 to move in various directions. Also, the horizontal members 210, in one embodiment, include the sensor arrays 102, 104 and/or the neutron pulse detector(s) 120. This allows an entity 222 to be examined for detection and identification of hazardous materials within the entity 222 as is discussed in greater detail below.

An operator booth 218 can be mechanically coupled at various locations on the mobile frame structure 200. The operator booth 218 comprises controls that enable an operator to maneuver the mobile frame structure over an entity 222 to be examined. Also, an operator can control a lifting mechanism 220 for transporting an entity 222 such as a container. FIG. 2 shows the lifting mechanism 220 being mechanically coupled to a set of rails 224, 226, which slide up and down on the vertical structures 202, 204, 206, 208. This allows the lifting mechanism 220 to move up and down, thereby lifting and lowering then entity 222 when mateably coupled to the lifting mechanism 220. It should be noted that the lifting mechanism can be mechanically coupled to the mobile frame structure in other ways not shown in FIG. 1. For example, the lifting mechanism 220 can be mechanically coupled to a top portion 228 (if included) of the mobile frame structure 200 as well.

The lifting mechanism 200, in one embodiment, also houses a set sensor arrays 102, 104 and/or the neutron pulse detector(s) 120. Therefore, as an entity is being transported by the mobile frame structure 200, an analysis of the entity can be performed. It should be noted that a lifting mechanism 220 is not required. For example, mobile frame structure 200 can drive over an entity to be examined or the entity can drive through the mobile frame structure 200. The structure 220 can be used only to house the sensor arrays 102, 104 and/or the neutron pulse detector(s) 120 so that the entities can be analyzed as they pass under the structure 220 or stop under the structure 220. If the lifting mechanism 220 is not used to lift an entity 222, the structure 220 can still be lowered to a position over the entity or mated with the entity 222 such that the analysis process can be performed.

In one embodiment, the frame structure 200 can retract/increase in size to accommodate smaller/larger entities and to also reduce height and width to fit onto a standard transportation vehicle. For example, each of the four vertical structures 202, 204, 206, 208 can retract/increase in height. Also, the rails 224, 226 can also retract/increase in width. This is advantageous because different entities have varying heights and widths and because the mobile frame structure 200 can dynamically change height and width dimensions, a proper analysis of the entity is ensured. Also, the mobile frame structure 200 can easily be transported by standard size transportation vehicles.

The mobile frame structure 200 can be driven locally and can also be driven and operated via remote control. For example, a user can use the remote monitoring system 150 to remotely control the mobile frame structure 200 such as driving the mobile frame structure 200, positioning the lifting mechanism/scanner housing 220, activating/deactivating scanners, controlling the analysis process, and the like. This remote operation can be done over wired and/or wireless links. Additionally, an operator can remotely operate the mobile frame structure 200 over a network such as the Internet as well. Remote operation is advantageous because the mobile frame structure 200 can be operated without placing humans in dangerous conditions such as handling containers with hazardous materials.

As discussed above, the sensor arrays 102, 104 and/or the neutron pulse detector(s) 120 can be deployed on the sides (e.g., the horizontal structures 210) and/or the lifting mechanism 220. Additionally, the sensor arrays 102, 104 and/or the neutron pulse detector(s) 120 can also be deployed on the vertical structures 202, 204, 206, 208 and/or a bottom platform (not shown) that is situated under the entity 222 being examined.

The mobile frame structure 200 includes a detection area/zone 301 (FIG. 3) which is the area between the frame structure 200 and between the active 120 or passive detector arrays 102, 104 deployed thereon. An example active detector system is a micro-neutron pulse device 120 and associated shielding system (FIG. 7) for detection and identification of chemical, biological, nuclear and explosives (CBRNE) materials. These detector arrays 102, 104, 120 can be configured to meet a wide variety of applications such as: shipping container inspection, seaport security, cargo terminal security, airport vehicle inspection, airport cargo inspection, airport baggage inspection, vehicle inspection, truck stop cargo inspection, border protection inspecting vehicles, cargo, persons, railway inspections, railcar inspection, subway security, persons, and more.

Figure 3:
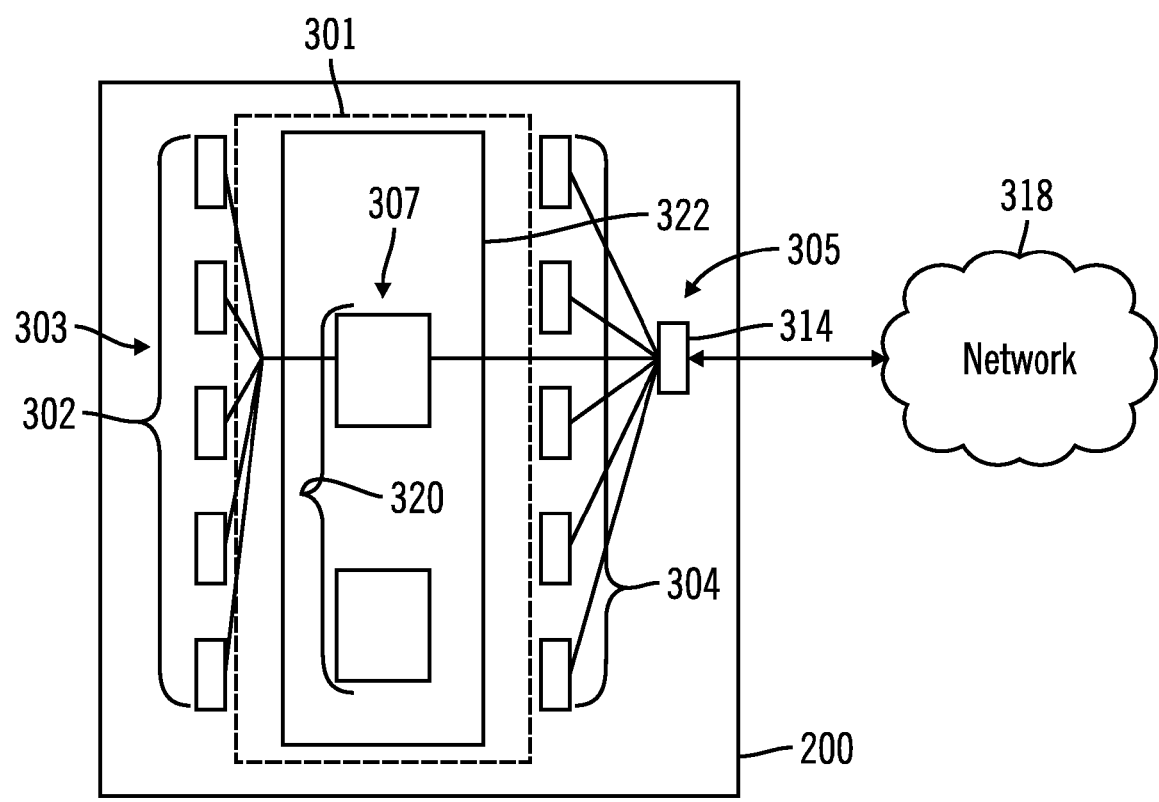
FIG. 3 is a block diagram illustrating a detection zone within the mobile frame structure of FIG. 2 according to one embodiment of the present invention.

For example, FIG. 3 shows a detection zone 301 existing between a distributed sensor array comprising a sensor array 302 deployed on a first side 303 of the mobile frame structure 200, a sensor array 304 deployed on a second side 305 of the mobile frame structure 200, and a sensory array 320 deployed on an area/portion 307 of the mobile frame structure 200 that is above (and/or below) the entity 322 being examined. In one embodiment, one of the sensor arrays 302, 304 on the side 303, 305 of the structure 200 includes a gamma sensor array and the other side 303, 305 of the structure includes a neutron sensor array.

It should be noted that each of the side sensor arrays 302, 304 can include a combination of gamma and neutron sensors. Alternatively, the upper (and lower if used) sensor arrays 320 can also include gamma and/or neutron sensor arrays as well. However, in one embodiment, the upper (and/or lower) sensor array 320 includes a neutron pulse sensor array, which is discussed in greater detail below. It should be noted that the side sensor arrays 302, 204 can also include neutron pulse detectors as well. Each of the sensor arrays 302, 304, 320 is communicatively coupled to one or more SIU 314, which is communicatively coupled to one or more networks 318.

Figure 4:
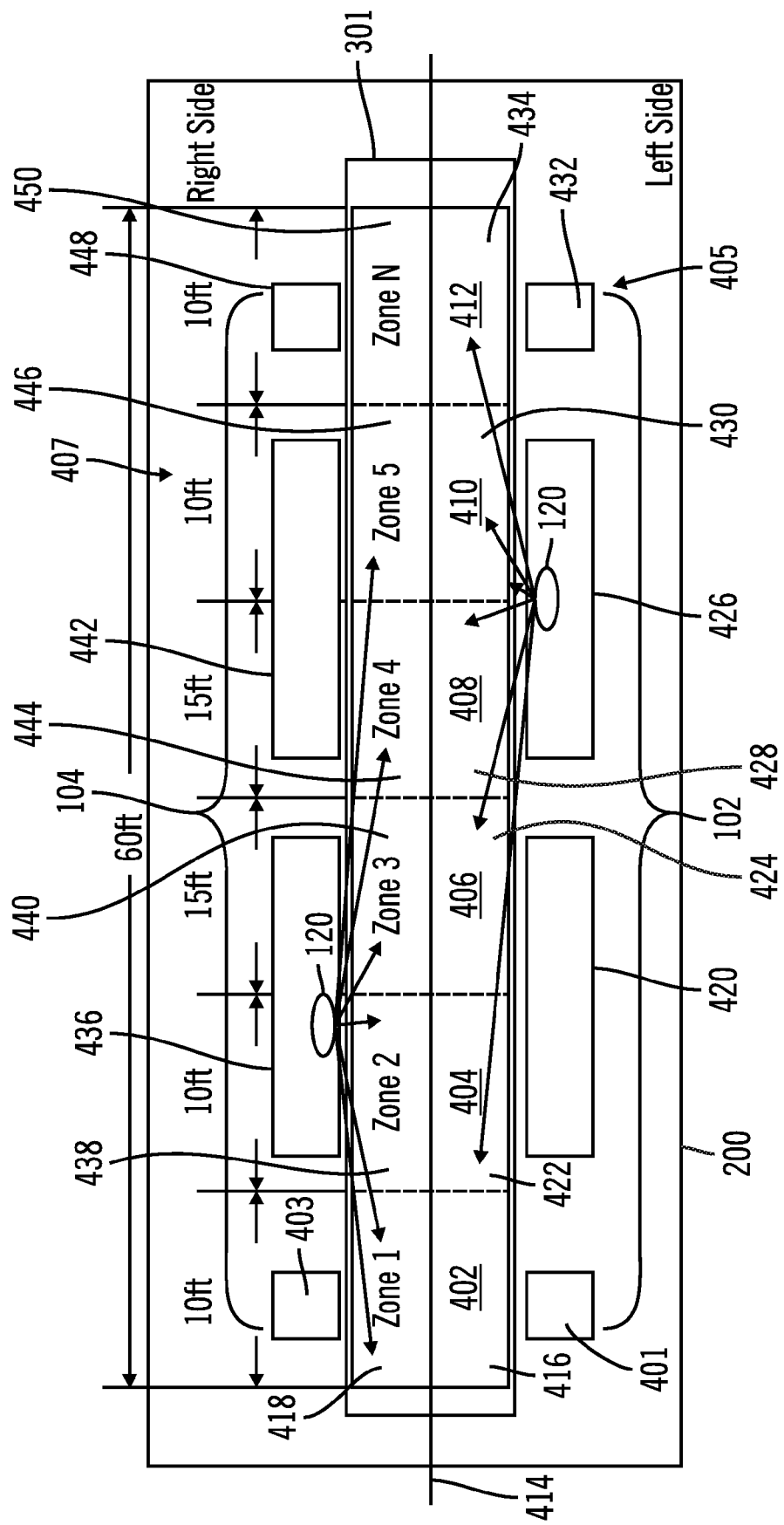
FIG. 4 is a block diagram illustrating multiple detection zones within the mobile frame structure of FIG. 2 according to one embodiment of the present invention.

The detection zone 301 discussed above, in one embodiment, is partitioned into a plurality of different zones, each zone being associated with one or more sensors in a sensor array 302, 304. For example, FIG. 4 shows a top view of a plurality of zones 402, 404, 406, 408, 410, 412 within a frame structure 200 that comprises a target detection area 301. A first horizontal sensor array 102 is deployed on a first side 405 (e.g., horizontal member 210) of the frame structure 200 and a second horizontal sensor array 104 is deployed on a second side 407 of the frame structure 200 opposite from the first side 405. FIG. 4 also shows an imaginary center line 414 running the length of the zones. This imaginary center line 414 is shown for reference purposes only to denote a first portion 416 (e.g., a left portion) of a zone and a second portion 418 (e.g., right portion) of a zone.

Each portion 416, 418 of a zone 402 is associated with one or more sensors 401, 403 of the sensor array 102, 104 deployed on that particular side 405, 407 of the frame structure 200. For example, the horizontal sensor array 102 deployed on the first side 405 of the frame structure 200 (which is the left side in this example) has a first set 401 of sensors associated with a first portion 414 (which is the portion to the left of the centerline 414 in this example) of Zone_1 402. The horizontal sensor array 104 deployed on the second side 407 of the frame structure 200 (which is the right side in this example) has a set of sensors 403 associated with a second portion 418 (which is the portion to the right of the centerline 414 in this example) of Zone_1 402.

FIG. 4 also shows that a second set 408 of sensors in the first horizontal array 102 is associated with a first portion 422 of Zone_2 404 and a first portion 424 of Zone_3 406. A third set 424 of sensors in the first horizontal array 102 is associated with a first portion 428 of Zone_4 408 and a first portion 420 of Zone_5 410. A fourth set of sensors 432 in the first horizontal array 102 is associated with a first portion 434 of a Zone_N 412. FIG. 4 further shows that a second set 436 of sensors in the second horizontal array 104 is associated with a second portion 438 of Zone_2 404 and a second portion 440 of Zone_3 406. A third set of sensors 442 in the second horizontal array 104 is associated with a second portion 444 of Zone_4 408 and a second portion 446 of Zone_5 410. A fourth set of sensors 448 in the second horizontal array 104 is associated with a second portion 450 of Zone_N 412.

It should be noted the sensors are not limited to only scanning their associated zone portion as the sensors can be configured to scan across both portions 416, 418 of a zone. For example, sensors within the first set 401 of the first horizontal array 102 can scan from the "left" side 416 of Zone_1 402 across to the "right" side 428 of Zone_1 402. Sensors within the first set 403 of the second horizontal array 104 can scan from the "ride" side 418 of Zone_1 402 across to the "left" side 426 of Zone_1 402. This results in scans with different perspectives.

However, in one embodiment, sensors are configured to scan out to given distances and in given directions. Therefore, the zones are partitioned according to the sensor types being deployed in the sensor arrays and based on sensor configurations (e.g., known distances and directions associated with each sensor within an array). For example, FIG. 4 shows that each zone with the exception of Zone_3 406 and Zone_4 408 (spaced 15 ft apart from adjacent zones) are spaced 10 ft apart. It should be noted that these distances are only examples and do not limit the present invention in any way. The number of zones and the spacing of zones, in one embodiment, is a function of the sensor configurations within the sensor arrays.

Figure 5:
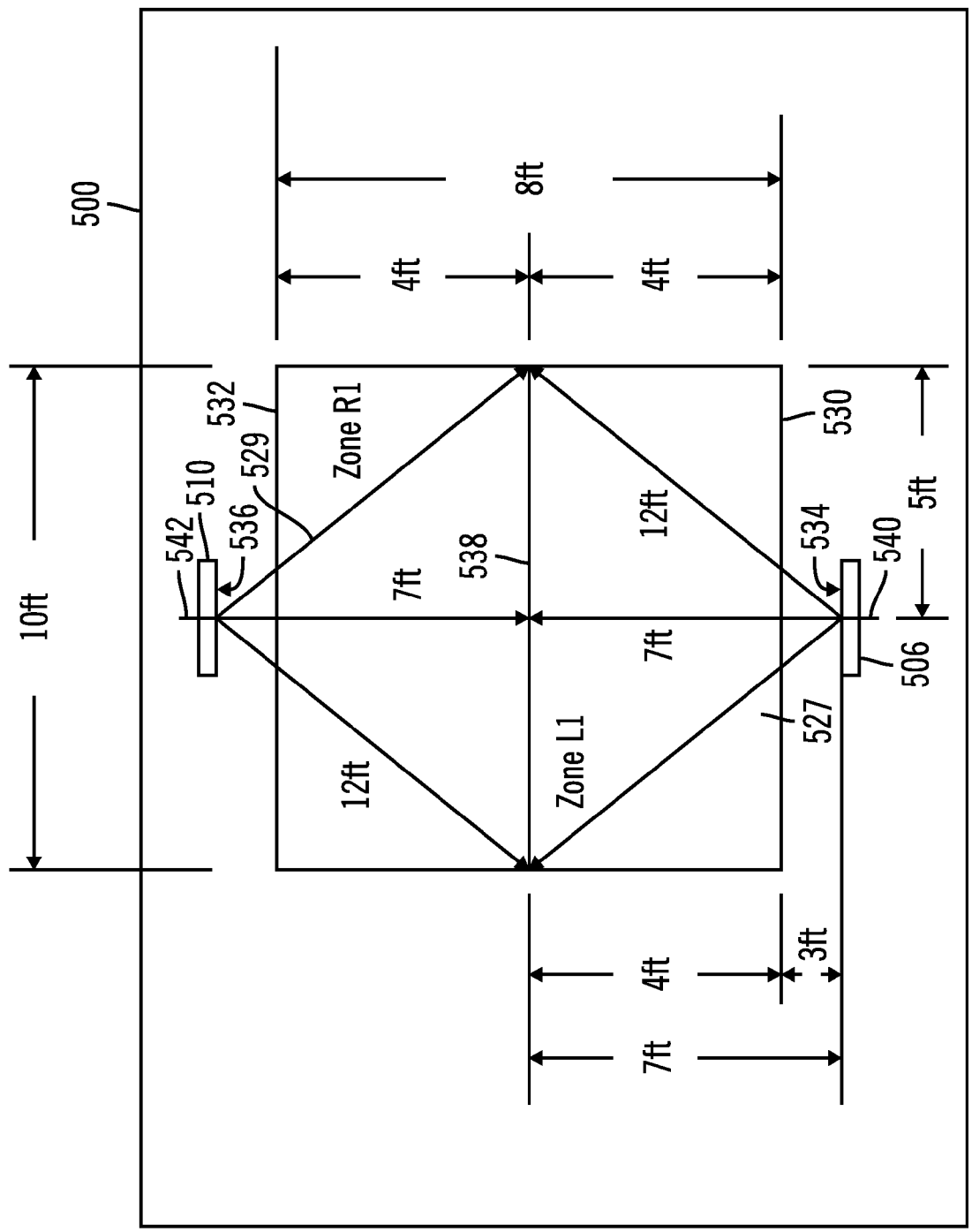
FIG. 5 is a block diagram illustrating a more detailed view of one of the detection zones of FIG. 4 according to one embodiment of the present invention.

FIG. 5 shows a more detailed view of Zone_1 411. In particular, FIG. 5 shows scanning distances and directions associated with sensors in a set of sensors for each portion of the zone. For example, FIG. 5 shows a first sensor 506 within the first side sensor array 402 associated with Zone_1 411 and a second sensor 510 within the second side sensor 404 array associated with Zone_1 411. FIG. 5 also shows that Zone_1 411 is 8 ft wide with each portion 527, 529 of the zone being 4 ft wide. Each sensor 506, 510 is situated on the frame structure 500 3 ft from an outer edge 530, 532 of the zone. Therefore, a portion 534, 536 of the sensor 506, 510 facing the outer edge 530, 532 of the zone is 7 ft from an inner edge 538 (e.g., the center line) of the zone. The sensors 506, 510 are also deployed on the mobile frame structure 500 such that a middle line 540, 542 of the sensors is substantially aligned with the midpoint of the zone. Each sensor 506, 510 also scans out in all directions to the inner edge 538 (centerline) of its portion 527, 529, as shown in FIG. 5. It should be noted that distances and configurations shown in FIG. 5 are for illustrative purposes only and do not limit the present invention in any way.

Returning back to FIG. 4, FIG. 4 also shows placements of micro-pulse neutron devices 120. In particular, FIG. 4 shows that one or more micro-neutron pulse devices 120 are deployed within the third set 426 of sensor of the first side horizontal sensory array 102 and the second set 436 of sensors in the second side horizontal sensor array 104. As can be seen, this deployment configuration allows each of the zones 402, 404, 406, 408, 410, 412 to be associated with at least one micro-neutron pulse device 120. It should be noted that the micro-neutron pulse devices 120 are not limited to being deployed on the sides 405, 407 of the frame structure 200. For example, one or more micro-neutron pulse devices 120 can be deployed above/below the sensor arrays 102, 104 and the entity 210 being examined. In this embodiment, the neutron pulse devices 120 can be deployed above the sensor arrays 102, 104 and the entity 210 on the side members 405, 407 of the structure 200 or directly above the entity 210. The neutron device 120 can also be deployed under the sensor arrays 120, 104 and/or under the entity 210 as well. It should be noted that the deployment configuration of the micro-neutron pulse devices 120 shown in FIG. 4 is only for illustration purposes and does not limit the present invention in any way.

Figure 6:
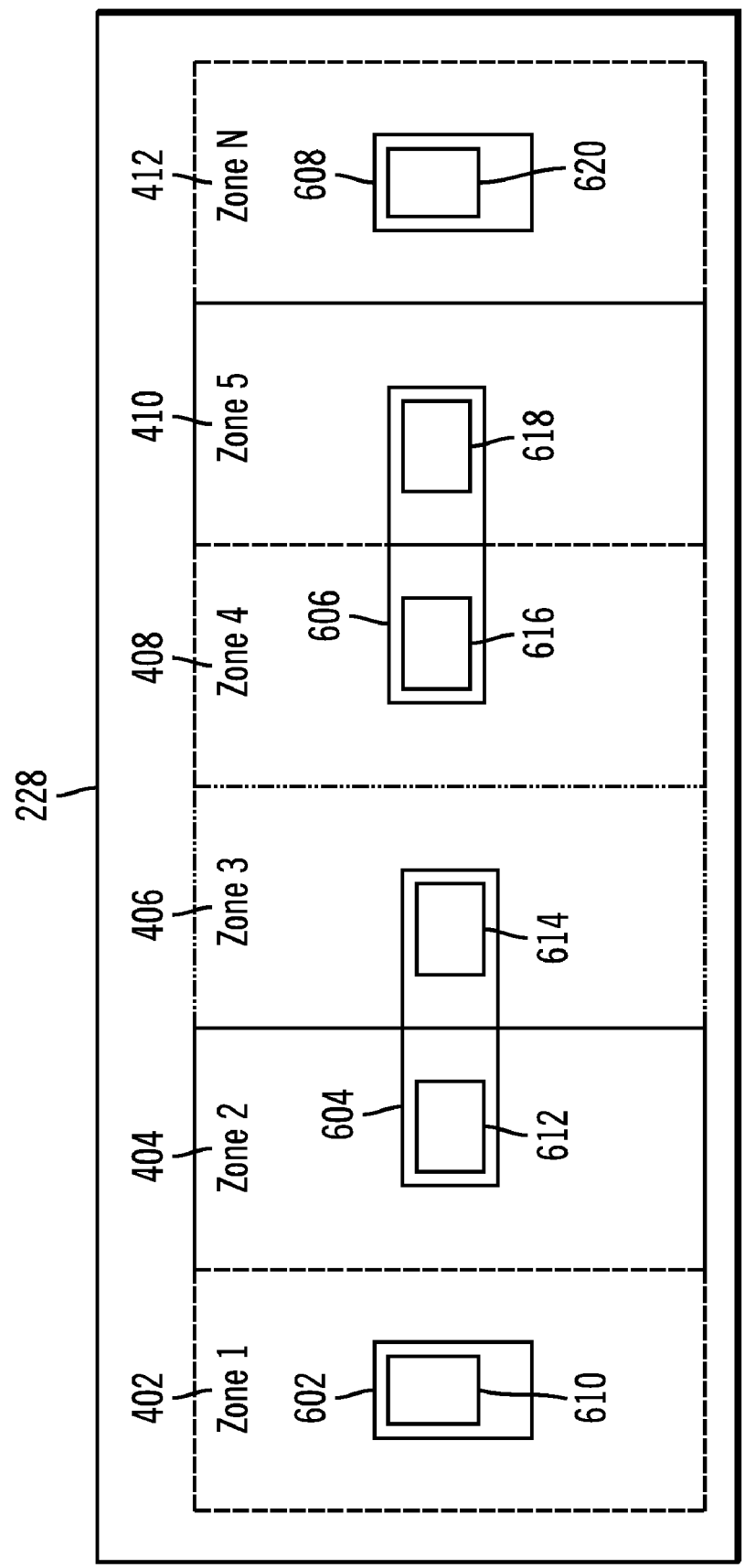
FIG. 6 is a block diagram illustrating one example of a sensor configuration within the mobile frame structure of FIG. 2 according to one embodiment of the present invention.

FIG. 6 shows additional deployment configurations for gamma and neutron sensors. For example, FIG. 6 shows sensors sensor sets 602, 604, 606, 608 comprising sensors 610, 612, 614, 616, 618, 620 such as gamma and/or neutron sensors being deployed on a top portion 228 of the frame structure 200. As discussed above, the top portion 402 of the frame structure 200 is situated above the entity 222 being examined. In the example of FIG. 6 one or more sensors 610, 612, 614, 616, 618, 620 are deployed over each zone 402, 404, 406, 408, 410, 412. In particular, a first sensor set 602 comprising sensor 610 is associated with Zone_1 402, a second sensor set 604 comprising sensor 412 associated with Zone_2 404 and sensor 614 associated with Zone_2 606, a third sensor set 806 comprising sensor 612 associated with Zone_4 408 and sensor 618 associated with Zone_6 410, and a fourth sensor set 608 comprising sensor 620 associate with Zone_N 412.

In one embodiment, the first and fourth sensor sets 602, 620 are situated parallel to each other and perpendicular to the second and third sensor sets 604, 606. The configuration of FIG. 6 is also applicable to a deployment configuration of sensors underneath an entity to be examined as well. Also, neutron pulse devices 120 can also be deployed in a similar fashion. It should be noted that the deployment configuration of FIG. 6 is used for illustrative purposes only and the sensors can be deployed in other configurations as well.

With respect to examining an entity 222 to identify hazardous materials, the mobile frame structure 200 can move over the entity 222. In this embodiment, the frame structure 200 and the entity 222 can be stationary with respect to each other. In another embodiment, the entity 222 can drive/move in between the two horizontal members 210 of the structure 200 and stop so that the scanning process can be performed. In yet another embodiment, the mobile frame structure 200 can drive over the entity 222 and while continuing to move over the entity 222 perform the analysis operation. In another embodiment, the mobile frame structure 200 can be stationary while the entity 222 drives/moves in between the horizontal members 220 and continues to pass through the frame structure 200 as the analysis operation is being performed.

As the sensor arrays 102, 104 scan the entity 222, each of the gamma and/or neutrons sensors generate signals indicative of any gamma and/or neutron radiation detected. As discussed above, this sensor data 130 is collected by the data collection manager 126 and stored within one or more data storage units 128. The data analysis and monitoring manager 134 then analyzes the data 130 to determine if any hazardous materials have been detected.

For example, the data analysis and monitoring manager 134 includes a multi-channel analyzer ("MCA") 136 comprising one or more devices a device composed of multiple single channel analyzers ("SCA"). In one embodiment, the MCA 136, uses analog to digital converters combined with computer memory that is equivalent to thousands of SCAs and counters and is dramatically more powerful and cost efficient than individual SCAs. The SCA interrogates analog signals received from the individual radiation detectors 106, 108, 110, 112, and determines whether the specific energy range of the received signal is equal to the range identified by the single channel. If the energy received is within the SCA an SCA counter is updated. Over time, the SCA counts are accumulated. At a given time interval, a multi-channel analyzer 136 includes a number of SCA counts, which result in the creation of a histogram 158.

The histogram 158 represents the spectral image of the radiation that is present within the entity being examined. In one embodiment, a single histogram 158 can be created based on information received from all of the sensor arrays 102, 104. In another embodiment, a single histogram 158 can be created from the combination of one or more histograms associated with one or more sensors 106, 108, 110, 112 in the sensor arrays 102, 104. In yet another embodiment, a histogram 158 can be created for each sensor 106, 108, 110, 112, within the sensor arrays 102, 104. A more detailed discussion on histograms is given in U.S. Pat. No. 7,142,109 entitled "Container Verification System For Non-Invasive Detection Of Contents", filed on Feb. 27, 2006; and U.S. Pre-Grant Publication 2008/0048872 entitled, "Multi-Stage System For Verification Of Container Contents", filed on Oct. 31, 2007, the collective teachings thereof being hereby incorporated by reference in its entirety.

The histogram 158 is used by the spectral analyzer 138 to identify isotopes that are present in materials residing within in the entity under examination. One of the functions performed by the data and analysis manager 134 is spectral analysis, performed by the spectral analyzer 138, to identify the one or more isotopes, explosives or special materials residing within the entity under examination. With respect to radiation detection, the spectral analyzer 138 compares one or more spectral images (e.g., histograms 158) of the radiation that has been detected within the entity 222 to known isotopes that are represented by one or more spectral images stored 148 in the materials database 144. By capturing multiple variations of spectral data for each isotope there are numerous images that can be compared to one or more spectral images of the radiation present.

The materials database 144 holds one or more spectral images 148 of each isotope to be identified. These multiple spectral images represent various levels of acquisition of spectral radiation data so isotopes can be compared and identified using various amounts of spectral data available from the one or more sensors. Whether there are small amounts or large amounts of data acquired from the sensor, the spectral analyzer 138 compares the acquired radiation data from the sensor 106, 108. 110, 112 to one or more spectral images 148 for each isotope to be identified. This significantly enhances the reliability and efficiency of matching acquired spectral image data from the sensor to spectral image data of each possible isotope to be identified.

Once one or more possible isotopes are determined to be present in the radiation detected by the sensor(s) 106, 108, 110, 112, the data analysis and monitoring manager 134 compares the isotope mix against possible materials, goods, and/or products that may be present in the entity 222 under examination. The manifest database 142 includes a detailed description 146 of the contents of each entity 222 that is to be examined. The manifest 146 can be referred to by the data analysis and monitoring manager 134 to determine whether the possible materials, goods, and/or products, contained in the entity 222 match the expected authorized materials, goods, and/or products, described in the manifest 146 for the particular container under examination. This matching process, according to one embodiment of the present invention, is significantly more efficient and reliable than any container contents monitoring process in the past.

It should be noted that the spectral analyzer 138 is able to utilize various methods to provide multi-confirmation of the isotopes identified. Should more than one isotope be present, the spectral analyzer 138 identifies the ratio of each isotope present. Examples of methods that can be used for spectral analysis such as that discussed above include: 1) a margin setting method as described in U.S. Pat. No. 6,847,731 entitled "Method And System For Improving Pattern Recognition System Performance", filed Aug. 7, 2000, which is hereby incorporated by reference in its entirety; and 2) a LINSCAN method (a linear analysis of spectra method) as described in U.S. Provisional patent application Ser. No. 11/624,067, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

With respect to analysis of collected data pertaining to explosives and/or special materials, the spectral analyzer 138 and compares identified possible explosives and/or special materials to the manifest 148 by converting the stored manifest data 148 relating to the entity 222 under examination to expected explosives and/or radiological materials and then by comparing the identified possible explosives and/or special materials with the expected explosives and/or radiological materials. If the system 134 determines that there is no match to the manifest 148 for the entity 222 then the identified possible explosives and/or special materials are unauthorized. The system 134 can then provide information to system supervisory personnel to alert them to the alarm condition and to take appropriate action. For example, the user interface 140, 152 can present to a user a representation of the collected received returning signals, or the identified possible explosives and/or special materials in the entity 222 under examination, or any system identified unauthorized explosives and/or special materials contained within the entity 222 under examination, or any combination thereof.

A more detailed discussion on spectral analysis is given in U.S. Pat. No. 7,142,109 entitled "Container Verification System for Non-Invasive Detection of Contents", filed on Feb. 27, 2006; and U.S. Pre-Grant Publication 2008/0048872 entitled, "Multi-Stage System For Verification Of Container Contents", filed on Oct. 31, 2007, the collective teachings thereof being hereby incorporated by reference in its entirety.

In addition to gamma and neutron sensors, neutron pulse devices 120 can also be deployed on the mobile frame structure 200 as discussed above. The neutron pulse devices 120 include coincident counting capabilities. The gamma detectors within the neutron pulse device are used to identify chemical and explosives materials from the gamma response to the neutron pulse. The neutron detectors are used to identify shielded nuclear materials from the response.

For example, one or more micro-neutron pulse device(s) 120 create an active detection system that is deployed on the mobile frame structure 200 that enables the identification of chemical, nuclear and explosives materials based on the response from the neutron pulse. These non-intrusive inspection systems can interrogate entities 222 for the detection of shielded nuclear materials while maintaining a high hourly throughput in ports of entry, ports of departure, borders and other checkpoints.

The following is an illustrative approach for implementing an active sensor system deployed on the mobile frame structure 200. It should be noted that the following discussion is only used as an example and does not limit the present invention in any way. The passive (e.g., sensor arrays 102, 104) and/or active (e.g., neutron pulse device(s) 120) radiation threat identification system 100 can identify the specific isotopes present and detect shielded nuclear materials. The active portion of the system (MNP) is defined as a micro-neutron pulse test cycle enabling the identification of shielded nuclear materials.

One example of a micro-neutron pulse system includes a closed zone active system. The micro-neutron pulse device 120 enables active interrogation of an entity 222 using a 14 MEV pulsed neutron generator. For example, a illustrated in FIG. 7, the entity 222 may comprise highly enriched uranium (HEU) material. The system is able to use an off the shelf neutron generator such as those provided by Thermo Scientific, Inc. (e.g., model API-120). The detection system is able to use a number of organic liquid scintillators such as 12 organic liquid scintillators having a total collection area of 24300 $cm^2$. The organic liquid scintillators offer excellent discrimination of fast neutrons within the presence of slow neutrons and gammas. The detectors, in this example, are enlarged versions of an off the shelf detector such as those produced by Saint-Gobain, SA.

Figure 7:
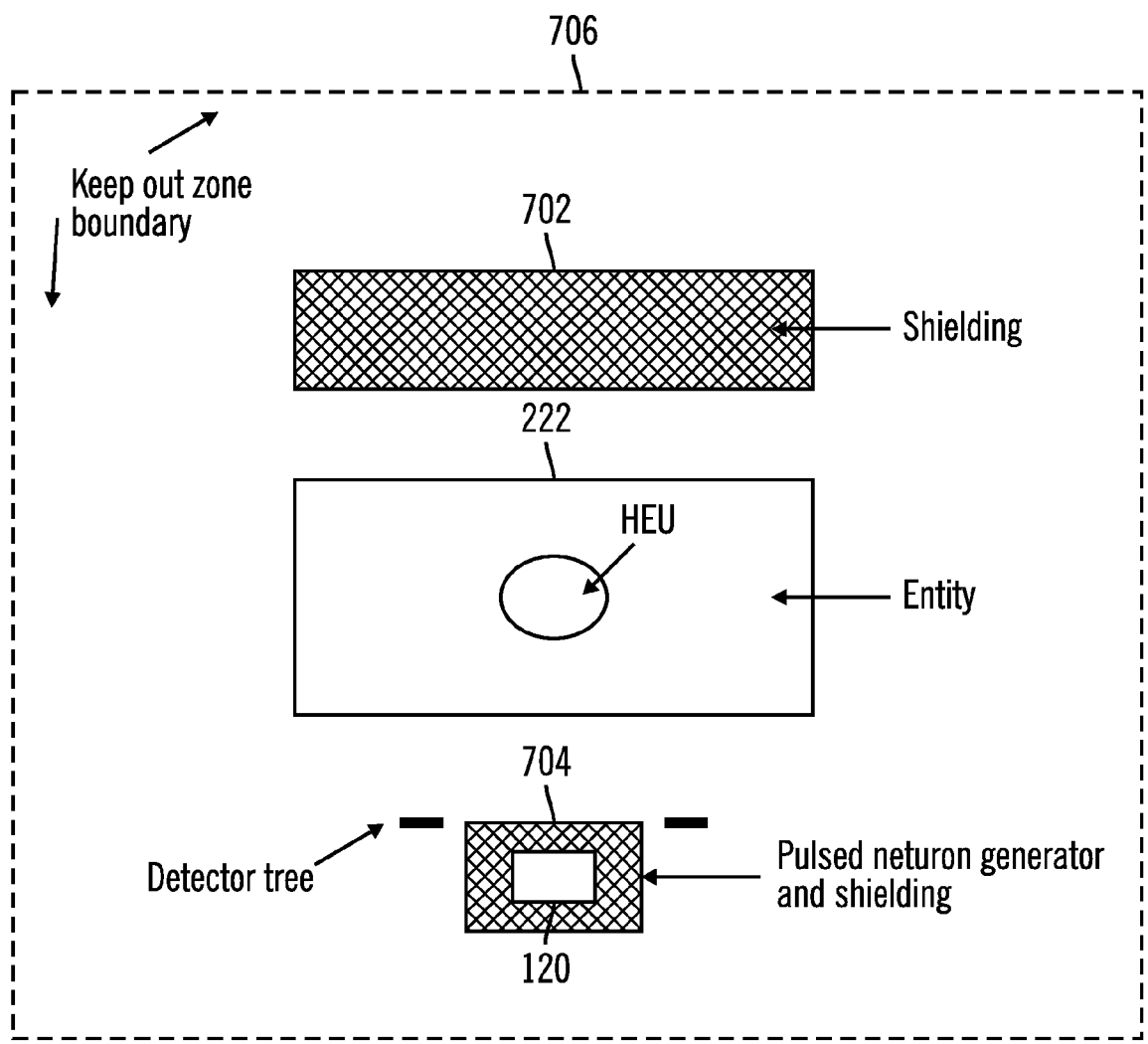
FIG. 7 is a block diagram illustrating a shielded environment in proximity to the mobile frame structure of FIG. 2 according to one embodiment of the present invention.

The mobile frame structure 200 can include one or more neutron shields 702, 704 as shown in FIG. 7. The shield, in one embodiment, includes two pieces, a back shield 702 and a shield 704 for the neutron generator 120. The back shield 702 includes a 1 meter thick polyethylene water tank 6.2 meters long and 4.2 meters high. The tank is portable and field assembled, then filled with boronated water. The neutron generator shield 704 includes a polyethylene-boron cylinder 1.5 meters diameter and 1 meter in length. The cylinder is hollowed out for placement of the neutron generator 120. The entire cylinder is clad with 1 cm of cadinum metal to absorb neutrons. FIG. 7 also shows a boundary zone 706 that designates a "do-not cross" boundary when the active system is in use. However, because the operating environment 100 can be operated remotely, users do not have to be near the boundary zone 706 during the active system operation.

Figure 8:
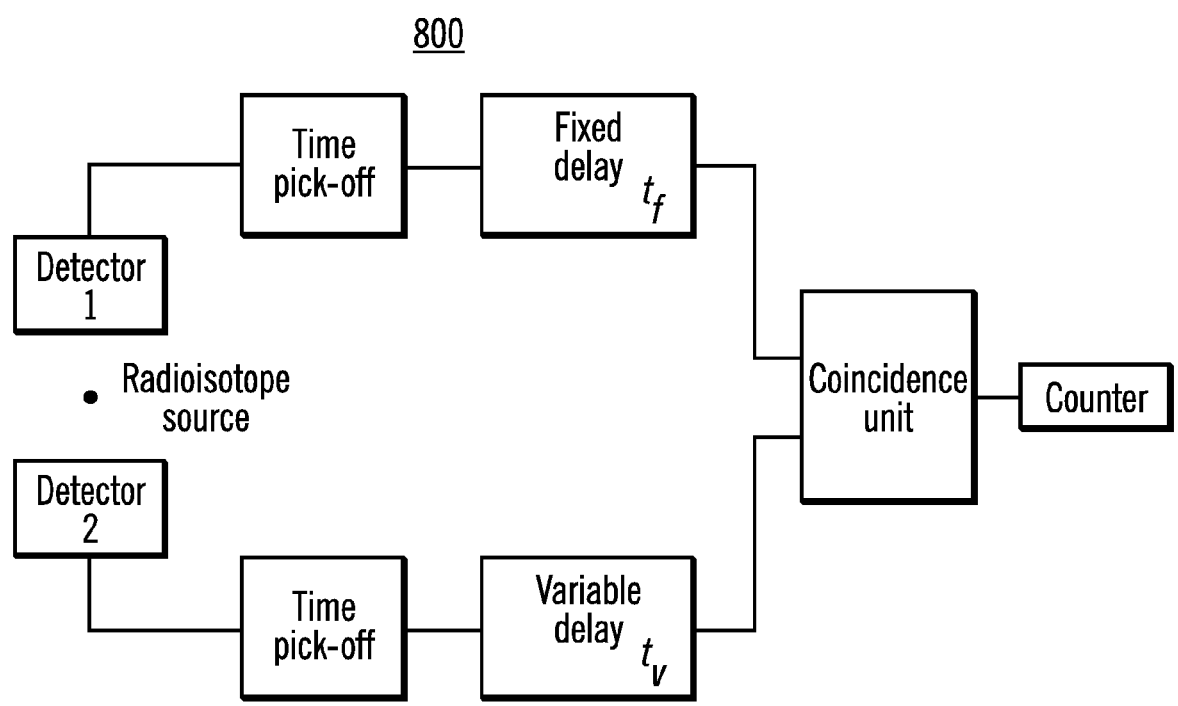
FIG. 8 is a schematic of a coincident counting circuit according to one embodiment of the present invention.

The active detection system, in one embodiment, uses coincident counting. An example of a circuit 800 for coincident counting is shown in FIG. 8. Each count from the fast neutron detector is time tagged. The pulsed neutron source 120 includes an alpha detector. The emission of each neutron from the source is accompanied by a corresponding alpha emitted substantially 180 degrees relative to the emitted neutron. The pulses from the alpha detector are also time tagged. The output from the alpha detector is compared with the output from the fast neutron counter. When the electronics (including the Coincident unit and counter in FIG. 8) receive an alpha count, detector 1, coincident with a fast neutron count in detector 2, a fission event is registered. When this coincident fission event is detected it signifies that a source neutron has caused fission in the container volume and the resulting fission has released a neutron which has been detected by the fast neutron detectors. The fission process happens in $1 \times 10^{-17}$ seconds. The outgoing pulse neutron and the return fission neutron, have a round trip travel time of about 24 ns. Thus the fission neutron appears 24 ns after the alpha particle. This signal signifies the presence of fissile material. This approach effectively discriminates against any non fissionable material.

The approach discussed above greatly reduces false alarms with Phantom materials. The signal-to-noise-ratio for this approach is set by the available fission signal and the noise floor, which is set by the chance coincident counts. The number of chance coincident counts is set by the counting rate from the alpha-neutron generator, the counting rate of the induced fission neutrons and the coincident resolving time. This noise floor is reduced by using the minimum coincident resolving time possible. This is determined by the fission event and the response time of the detectors, for example those referred to as a detector tree in FIG. 7, and various electronics such as the circuit 800 shown in FIG. 8. The rise time for organic liquid scintillators is about 1 ns and is a significant reason for choosing this type of detector in this embodiment. The processor speed is about 1 ns clock rate, in this example. Therefore the minimum resolving time is about 1 ns with this example hardware. The fission chain multiplication processes occur on a time scale of less than 300 ns. Therefore a 512 ns time window is chosen in this embodiment. However, it should be noted that other detector types and time windows can be chosen.

As can be seen from the above discussion, one or more sensors and/or sensor arrays can be used as passive detectors or be combined with an active system within a mobile frame structure. The mobile frame structure can be driven/moved into position over an entity to be examined or an entity can drive/move under the structure. The frame structure can retract/increase in size for accommodating various sized entities and/or transportation devices. The mobile frame structure and analysis/identification system can be operated remotely to ensure the safety of workers.

The various embodiments discussed above are advantageous because detection and identification of the chemical, biological, radiological, nuclear, and/or explosive materials within an object can be performed in a matter of seconds using distributed sensor arrays. The identification of the specific isotope(s) that are present within an object being examined allows the system to also identify the types of goods or materials that the isotopes represent. With a list of potential goods that represent the identified isotopes, the system can perform a comparison between the identified goods or materials and the container manifest to determine if the radiological material(s) present match the expected materials within the container. The process of 1) identifying the isotope(s) that are within a container, 2) identifying the goods or materials that the isotopes represent and 3) verifying the contents of the manifest against the identified goods, allows the efficient verification of the container without negative impact to the flow of commerce.

Figure 9:
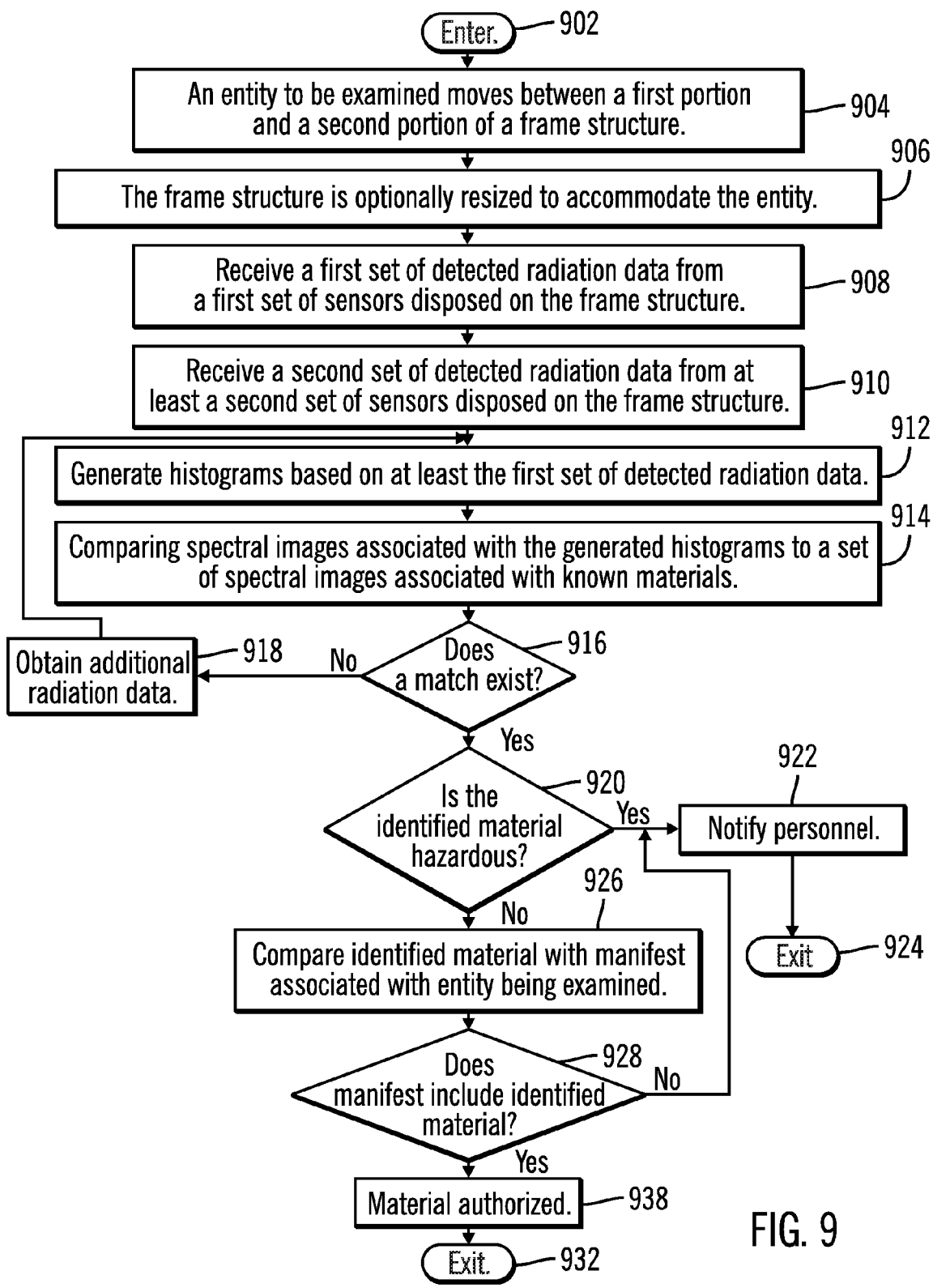
FIG. 9 is an operational flow diagram illustrating one process of detecting radiation and identifying hazardous materials associated with the radiation using a mobile frame structure according to one embodiment of the present invention.

Example of a Process for Radiation Detection and Identification Using a Mobile Frame Structure FIG. 9 is an operational flow diagram illustrating one process of detecting radiation and identifying hazardous materials associated with the radiation using a mobile frame structure. The operational flow diagram starts at step 902 and flows directly into step 904. The data analysis and monitoring manager 134, at step 904, determines that an entity 222 to be examined has moved between a first portion 405 and a second portion 407 of a mobile frame structure 200. The manager 134, at step 906, optionally resizes the mobile frame structure such by retracting/expanding one or more portions of the structure 200 to accommodate the entity 222.

The manager 134, at step 908, receives a first set of detected radiation data from a first set of sensors 102 that are disposed on one or more portions (e.g., 210, 228) of the mobile frame structure 200. The manager 134, at step 910, receives a second set of detected radiation data from at least a second set of sensors 104 that are disposed on one or more portions (e.g., 210, 228) of the mobile frame structure 20. For example, the manager 134 can receive gamma and/or neutron counts associated with an energy level detected by the sensor arrays 102, 104. It should be noted that neutron pulse information can also be provided to the manager 134 as well. Further it should be noted that the sensor arrays 102, 104 can perform their detection operations while the entity 222 is moving through the mobile frame structure 200, while the entity 222 and structure 200 are stationary, and while the entity 222 is stationary and the mobile frame structure 200 moves over the entity 222.

The manager 134, at step 912, generates one or more histograms 148 based on at least the first set of detected radiation data. The manager 134, at step 914, compares spectral images associated with the generated histograms to a set of spectral images 148 associated with known materials. The manager 134, at step 916, determines if a match exists between the spectral images associated with the generated histograms 148 and the set of spectral images 148 associated with known materials. If the result of this comparison is negative, the manager 134, at step 918, obtains additional radiation data from the sensors 102, 104 and the control flow returns to step 912. If the result of this determination is positive, the manager 134, at step 920, determines if the material identified by the comparison is hazardous. If the result of this determination is positive, the manager 134, at step 922, notifies personnel. The control flow then exits at step 924.

If the result of this determination is negative, the manager 134, at step 926, compares the identified material with a manifest 146 associated with the entity being examined. The manager 134, at step 928, determines if the manifest includes the identified material. If the result of this determination is negative, the identified material is unauthorized and the manager 134, at step 922, notifies personnel. The control flow then exits at step 924. If the result of this determination is positive, the manager 134, at step 930, determines that the identified material is authorized and the control flow then exits at step 932.

Information Processing System

Figure 10:
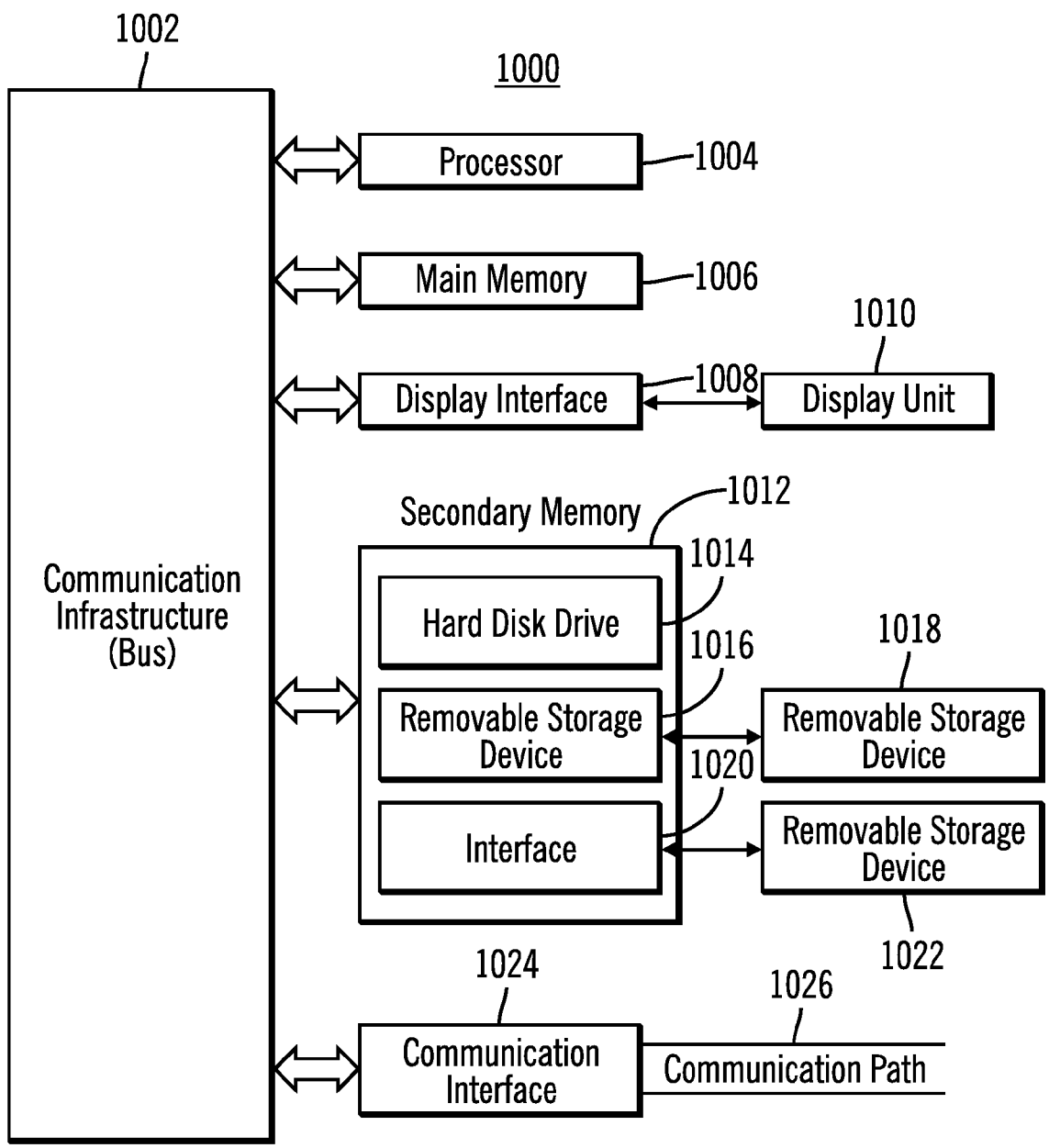
FIG. 10 is a block diagram illustrating a detailed view of an information processing system, according to one embodiment of the present invention.

FIG. 10 is a high level block diagram illustrating a more detailed view of a computing system 1000 such as the information processing system 132 useful for implementing the data and analysis manager 134 according to the various embodiments of the present invention. The computing system 1000 is based upon a suitably configured processing system adapted to implement an exemplary embodiment of the present invention. For example, a personal computer, workstation, or the like, may be used.

In one embodiment of the present invention, the computing system 1000 includes one or more processors, such as processor 1004. The processor 1004 is connected to a communication infrastructure 1002 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 1000 can include a display interface 1008 that forwards graphics, text, and other data from the communication infrastructure 1002 (or from a frame buffer) for display on the display unit 1010. The computing system 1000 also includes a main memory 1006, preferably random access memory (RAM), and may also include a secondary memory 1012 as well as various caches and auxiliary memory as are normally found in computer systems. The secondary memory 1012 may include, for example, a hard disk drive 1014 and/or a removable storage drive 1016, representing a floppy disk drive, a magnetic tape drive, an optical disk drive, and the like. The removable storage drive 1016 reads from and/or writes to a removable storage unit 1018 in a manner well known to those having ordinary skill in the art.

Removable storage unit 1018, represents a floppy disk, a compact disc, magnetic tape, optical disk, etc., which is read by and written to by removable storage drive 1016. As may be appreciated, the removable storage unit 1018 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 1012 may include other similar means for allowing computer programs or other instructions to be loaded into the computing system 1000. Such means may include, for example, a removable storage unit 1022 and an interface 1020. Examples of such removable storage may include a program cartridge and cartridge interface (such as that found in video game devices), a removable memory chip (such as an EPROM or PROM) and associated socket, and other removable storage units 1022 and interfaces 1020 which allow software and data to be transferred from the removable storage unit 1022 to the computing system 1000.

The computing system 1000, in this example, includes a communications interface 1024 that acts as an input and output and allows software and data to be transferred between the computing system 1000 and external devices or access points via a communications path 1026. Examples of communications interface 1024 may include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. The signals are provided to communications interface 1024 via a communications path (i.e., channel) 1026. The channel 1026 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 1006 and secondary memory 1012, removable storage drive 1016, and a hard disk installed in hard disk drive 1014. The computer program products are means for providing software to the computer system. The computer readable medium allows the computer system to read data, instructions, messages or message packets, and other computer readable information from the computer readable medium.

Computer programs (also called computer control logic) are stored in main memory 1006 and/or secondary memory 1012. Computer programs may also be received via communications interface 1024. Such computer programs, when executed, enable the computer system to perform the features of the various embodiments of the present invention as discussed herein. In particular, the computer programs, when executed, enable the processor 1004 to perform the features of the computer system.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a mobile frame structure comprising a first portion and a second portion configured to examine an entity to be examined therebetween, for detecting radiation and identifying materials associated with radiation that has been detected, the method comprising:
   maneuvering at least one of the entity and the mobile frame structure such that the mobile frame structure is located over the entity to be examined for radiation sources emitting radiation from the entity;
   receiving from a set of radiation sensors mechanically coupled to the at least one portion of the mobile frame structure, a set of radiation data associated with the entity;
   generating at least one histogram based on the set of radiation data, wherein the at least one histogram represents a spectral image of at least one radiation source associated with the entity;
   comparing the at least one histogram to a plurality of spectral images associated with known materials;
   determining that the at least one histogram substantially matches at least one of the plurality of spectral images;
   determining if a material associated with the at least one of the plurality of spectral images comprises a hazardous material;
   notifying personnel that the at least one radiation source comprises a hazardous material in response to determining that the material associated with the at least one of the plurality of spectral images comprises a hazardous material;
   comparing the material with at least one manifest associated with an entity comprising the radiation source;
   determining if the material matches at least one item on the at least one manifest; and
   notifying personnel that the entity comprises at least one unauthorized item, in response to determining that the material fails to match any item on the at least one manifest.

2. The method of claim 1, further comprising:
   re-sizing the mobile frame structure to accommodate the entity by one of retracting and expanding one or more portions of the mobile frame structure.

3. The method of claim 1, wherein the set of radiation data is received while the entity is moving through the mobile frame structure.

4. The method of claim 1, wherein the set of radiation data is received while the entity is stationary and the mobile frame structure is stationary.

5. The method of claim 1, wherein the set of radiation data is received while the entity is stationary and the mobile frame structure is moving over the entity.

6. The method of claim 1, wherein the set of radiation data includes at least gamma radiation information.

7. A mobile frame structure for detecting radiation and identifying materials associated with radiation that has been detected, the mobile frame structure comprising:
   a mobility mechanism for maneuvering the mobile frame structure over an entity;
   a first side portion;
   at least a second side portion situated substantially opposite to the first side portion, wherein a passage is created between the first side portion and the at least second side portion configured to allow the entity to pass between the first side portion and the at least second side portion, and wherein at least one of the first side portion and the second side portion are adjustable in their position relative to each other;
   at least one set of radiation sensors mechanically coupled to at least one of the first side portion and the at least second side portion;
   a communication mechanism communicatively coupled to the at least one set of radiation sensors, wherein the communication mechanism transmits a set of radiation data associated with the entity that has been detected by the set of radiation detectors to at least one information processing system; and
   at least one information processing system communicatively coupled to the at least one set of radiation sensors, wherein the at least one information processing system is adapted to:
      receive from the at least one set of radiation sensors the set of radiation data associated with the entity,
      generate at least one histogram based on the set of radiation data, wherein the at least one histogram represents at least one spectral image associated with the entity;
      compare the at least one histogram to a plurality of spectral images associated with known materials;
      determine that the at least one histogram substantially matches at least one of the plurality of spectral images;
      determine if a material associated with the matching at least one of the plurality of spectral images is a hazardous material;

notify personnel that the entity comprises at least one radiation source that is a hazardous material in response to determining that the material associated with the at least one of the plurality of spectral images is a hazardous material;

determine that the material associated with the at least one of the plurality of spectral images fails to be a hazardous material;

compare the material with at least one manifest associated with the entity;

determine if the material matches at least one item on the at least one manifest; and notify personnel that the entity comprises at least one unauthorized item in response to determining that the material fails to match any item on the at least one manifest.

8. The mobile frame structure of claim 7, further comprising:

at least one additional portion situated above the first side portion and the second side portion.

9. The mobile frame structure of claim 8, wherein the at least one additional portion includes:

a set of radiation sensors disposed thereon.

10. The mobile frame structure of claim 7, wherein the set of radiation data includes at least gamma radiation information.

11. A system for detecting radiation and identifying materials associated with radiation that has been detected, the system comprising:

a mobile frame structure comprising:
  a mobility mechanism for maneuvering the mobile frame structure over an entity;
  a first side portion;
  at least a second side portion situated substantially opposite to the first side portion, wherein a passage is created between the first side portion and the at least second side portion configured to allow the entity to pass between the first side portion and the at least second additional side portion, and wherein at least one or the first side portion and the at least second side portion are adjustable in their position relative to each other;
  at least one set of radiation sensors mechanically coupled to at least one of the first side portion and the at least second side portion; and
  a communication mechanism communicatively coupled to the at least one set of radiation sensors, wherein the communication mechanism transmits a set of radiation data associated with the entity that has been detected by the set of radiation detectors to at least one information processing system; and
  at least one information processing system communicatively coupled to the at least one set of radiation sensors, wherein the at least one information processing system is adapted to:
    receive from the at least one set of radiation sensors the set of radiation data associated with the entity,
    generate at least one histogram based on the set of radiation data, wherein the at least one histogram represents at least one spectral image associated with the entity;
    compare the at least one histogram to a plurality of spectral images associated with known materials;
    determine that the at least one histogram substantially matches at least one of the plurality of spectral images;
    determine if a matching material associated with the at least one of the plurality of spectral images is a hazardous material;
    notify personnel that the entity comprises at least one radiation source that is a hazardous material in response to determining that the material associated with the at least one of the plurality of spectral images is a hazardous material;
    determine that the matching material associated with the at least one of the plurality of spectral images fails to be a hazardous material;
    compare the matching material with at least one manifest associated with the entity;
    determine if the matching material substantially matches at least one item on the at least one manifest; and
    notify personnel that the entity comprises at least one unauthorized item in response to determining that the matching material fails to substantially match any item on the at least one manifest.

12. The system of claim 11, wherein the mobile frame structure further comprises:

at least one additional portion situated above the first side portion and the second side portion.

13. The system of claim 12, wherein the at least one additional portion includes:

a set of radiation sensors disposed thereon.

14. The system of claim 11, wherein the set of radiation data includes at least gamma radiation information associated with the entity that has been detected by the set of radiation detectors.

15. The system of claim 11, wherein the mobile frame structure is adapted to re-size to accommodate the entity by one of retracting and expanding at least one of the first side portion and the at least second side portion.

* * * * *